US009886725B1

(12) United States Patent
Bober et al.

(10) Patent No.: US 9,886,725 B1
(45) Date of Patent: Feb. 6, 2018

(54) METHOD FOR MULTI-LEVEL DATA PRESENTATION FOR YEAR TO YEAR CHANGES IN TAX LIABILITY

(71) Applicant: Intuit Inc., Mountain View, CA (US)

(72) Inventors: Paul Bober, San Diego, CA (US); Nankun Huang, San Diego, CA (US); Gang Wang, San Diego, CA (US)

(73) Assignee: INTUIT INC., Mountian View, CA (US)

( * ) Notice: Subject to any disclaimer, the term of this patent is extended or adjusted under 35 U.S.C. 154(b) by 50 days.

(21) Appl. No.: 14/014,172

(22) Filed: Aug. 29, 2013

(51) Int. Cl.
 *G06Q 40/00* (2012.01)
(52) U.S. Cl.
 CPC .................................. *G06Q 40/123* (2013.12)
(58) Field of Classification Search
 CPC ............................... G06Q 40/02; G06Q 40/00
 USPC ...................................................... 705/31, 35
 See application file for complete search history.

(56) References Cited

U.S. PATENT DOCUMENTS

| 5,799,283 | A  | * | 8/1998  | Francisco ............... G06Q 20/02 235/375 |
| 7,539,635 | B1 |   | 5/2009  | Peak et al. |
| 7,860,763 | B1 |   | 12/2010 | Quinn et al. |
| 7,900,298 | B1 | * | 3/2011  | Char ....................... G06Q 40/02 5/31 |
| 8,082,144 | B1 |   | 12/2011 | Brown et al. |
| 8,423,433 | B1 |   | 4/2013  | Miller |
| 8,463,676 | B1 |   | 6/2013  | Dinamani et al. |
| 2002/0133410 | A1 | * | 9/2002 | Hermreck et al. .............. 705/19 |
| 2002/0169871 | A1 | * | 11/2002 | Cravo de Almeida ............... H04L 43/065 709/224 |
| 2008/0147494 | A1 | * | 6/2008 | Larson .......................... 705/14 |
| 2011/0264569 | A1 | * | 10/2011 | Houseworth et al. .......... 705/31 |
| 2011/0264570 | A1 |   | 10/2011 | Houseworth et al. |
| 2014/0201108 | A1 |   | 7/2014  | Chapman et al. |

FOREIGN PATENT DOCUMENTS

WO  WO 2004008367  1/2004

OTHER PUBLICATIONS

Wikipedia "Mouseover" wikipedia.org. http://en.wikipedia.org/wiki/Mouseover. Dec. 15, 2005.*
Wikipedia "Mouse Button" wikipedia.org. http://en.wikipedia.org/wiki/Mouse_button. Jul. 8, 2010.*

(Continued)

*Primary Examiner* — Bruce I Ebersman
*Assistant Examiner* — Mark Gaw
(74) *Attorney, Agent, or Firm* — Vista IP Law Group LLP; Gary D. Lueck

(57) ABSTRACT

The methods described herein are suitable for use in explaining changes in the net federal tax between a current year and a preceding year (e.g., year-over-year changes). Thus, the methods have suitability for comparing taxes due amounts between different tax years as well as refund amounts between different tax years. The computing device presents to a user of the tax preparation software a multi-level data presentation of the reasons contributing to the differences in tax liability between a current year and a preceding year. In one aspect, the reasons may be expanded or collapsed to sure more or less detail depending on user preference.

16 Claims, 9 Drawing Sheets

(56) References Cited

OTHER PUBLICATIONS

Ager, Simon "Building multilingual websites". Omniglot. http://www.omniglot.com/language/articles/multilingual_websites.htm. Aug. 13, 2006.*
WebNMS "Defining Thresholds" Zoho Corp. http://www.webnms.com/webnms/help/administrator_guide/performance/thresholds/perf_thresholdsintro.html. Nov. 14, 2012.*
Plasma.com "Panasonic PT-L780NTU XGA 3200 ANSI Lumens LCD Video Projector" Plasma.com. http://plasma.com/panasonicprojectors/ptl780.htm. Jun. 9, 2003.*
Microsoft. "How to Display Hierarchical Data by Using Nested Repeater Controls and Visual C# .NET" Microsoft Corp. http://support.microsoft.com/kb/306154. Jan. 8, 2007.*
O'Reilly "Types of Graphics File Formats" http://www.fileformat.info/mirror/egff/ch01_04.htm. Encyclopedia of Graphics File Formats Feb. 16, 2005.*
Wingenbach, Gary "Using Charts and Graphs" Texas A&M University, Agricultural Communications and Journalism. Oct. 13, 2008.*
Wikipedia ("Mouseover" wikipedia.org. http://en.wikipedia.org/wiki/Mouseover. Dec. 15, 2005).*
Wikipedia ("Mouse Button" wikipedia.org. http://en.wikipedia.org/wiki/Mouse_button. Jul. 8, 2010).*
Ager, Simon ("Building multilingual websites". Omniglot. http://www.omniglot.com/language/articles/multilingual_websites.htm. Aug. 13, 2006.).*
WebNMS ("Defining Thresholds" Zoho Corp. http://www.webnms.com/webnms/help/administrator_guide/performance/thresholds/perf_thresholdsintro.html. Nov. 14, 2012).*
Plasma.com ("Panasonic PT-L780NTU XGA 3200 ANSI Lumens LCD Video Projector" Plasma.com. http://plasma.com/panasonicprojectors/ptl780.htm. Jun. 9, 2003).*
Microsoft. ("How to Display Hierarchical Data by Using Nested Repeater Controls and Visual C# .NET" Microsoft Corp. http://support.microsoft.com/kb/306154. Jan. 8, 2007).*
O'Reilly ("Types of Graphics File Formats" http://www.fileformat.info/mirror/egff/ch01_04.htm. Encyclopedia of Graphics File Formats Feb. 16, 2005).*
Wingenbach, Gary ("Using Charts and Graphs" Texas A&M University, Agricultural Communications and Journalism. Oct. 13, 2008).*
TurboTax Support Posting, Why is my tax refund different this year? Or, why do I owe taxes when I normally get a refund? Updated: Feb. 11, 2013 Article ID: GEN80919, https://turbotax.intuit.com/support/iq/Tax-Refund/Why-is-my-tax-refund-different-this-year--Or--why-do-l-owe-taxes-when-I-normally-get-a-refund-/GEN80919.html (5 pages).
TurboTax TaxCaster 2012 (1 page).
Office Action dated Nov. 5, 2014 in U.S. Appl. No. 13/955,959, filed Jul. 31, 2013, inventor: Gang Wang, (15pages).
Amendment and Response dated Jan. 30, 2015 in U.S. Appl. No. 13/955,959, filed Jul. 31, 2013, inventor: Gang Wang, (18pages).
Office Action dated Mar. 24, 2015 in U.S. Appl. No. 13/955,959, filed Jul. 31, 2013, inventor: Gang Wang, (29pages).
Amendment and Response dated Jun. 24, 2015 in U.S. Appl. No. 13/955,959, filed Jul. 31, 2013, inventor: Gang Wang, (28pages).
Office Action dated Sep. 2, 2015 in U.S. Appl. No. 13/955,959, filed Jul. 31, 2013, inventor: Gang Wang, (28pages).
Notice of Appeal with Pre-Appeal Brief Conference Request dated Oct. 30, 2015 in U.S. Appl. No. 13/955,959, filed Jul. 31, 2013, inventor: Gang Wang, (7pages).
Decision from Pre-Appeal Brief Review Dec. 1, 2015 in U.S. Appl. No. 13/955,959, filed Jul. 31, 2013, inventor: Gang Wang, (2pages).
Amendment and Response dated Feb. 29, 2016 in U.S. Appl. No. 13/955,959, filed Jul. 31, 2013, inventor: Gang Wang, (17pages).
Wayback Machine for "Why's my Refund so Different from Last Year?", https://www.hrblock.com/tax-answers/services/sp/article.jsp?article_id=67173, May 2012 (1page).

* cited by examiner

METHOD FOR MULTI-LEVEL DATA PRESENTATION FOR YEAR TO YEAR CHANGES IN TAX LIABILITY

SUMMARY

The methods described herein are suitable for use in explaining changes in the net federal tax between a current year and a preceding year (e.g., year-over-year changes). Thus, the methods have suitability for comparing taxes due amounts between different tax years as well as refund amounts between different tax years. In some instances, the method may also present to user reasons why a refund in one tax year changed to a taxes due amount or vice versa.

In one embodiment, a computer-implemented method of presenting a user with tax liability changes between a current year and a preceding year includes a computing device executing tax preparation software configured to receive tax return data from a current year and a preceding year. The computing device creates a current year tree data structure, the current year tree data structure comprising a plurality of intermediate tax liability data for the current year. The computing device also creates a preceding year tree data structure, the preceding year tree data structure comprising a plurality of intermediate tax liability data for the preceding year. The computing device creates a differential tree data structure, the differential tree data structure comprising numerical differences between corresponding intermediate tax liability data from the current year and the preceding year. The computing device presents to a user of the tax preparation software a multi-level data presentation of the numerical differences from the differential tree data structure.

In another embodiment, a computer-implemented method of comparing a current year tax return to a preceding year tax return using tax preparation software includes a computing device receiving tax return data from a current year and creating a current year tree data structure, the current year tree data structure comprising a plurality of intermediate tax liability data for the current year. The computing device receives tax return data from a preceding year and creating a preceding year tree data structure, the current year tree data structure comprising a plurality of intermediate tax liability data for the preceding year. The computing device creates a differential tree data structure, the differential tree data structure comprising numerical differences between corresponding tax liability data from the current year and the preceding year. The computing device computes taxes due for the current year and the preceding year and presents to a user of the tax preparation software one or more reasons of why the computed taxes due differs from a taxes due amount from the preceding year, wherein the reasons presented to the user are associated with the differential tree data structure.

DETAILED DESCRIPTION OF ILLUSTRATED EMBODIMENTS

Figure 1A:
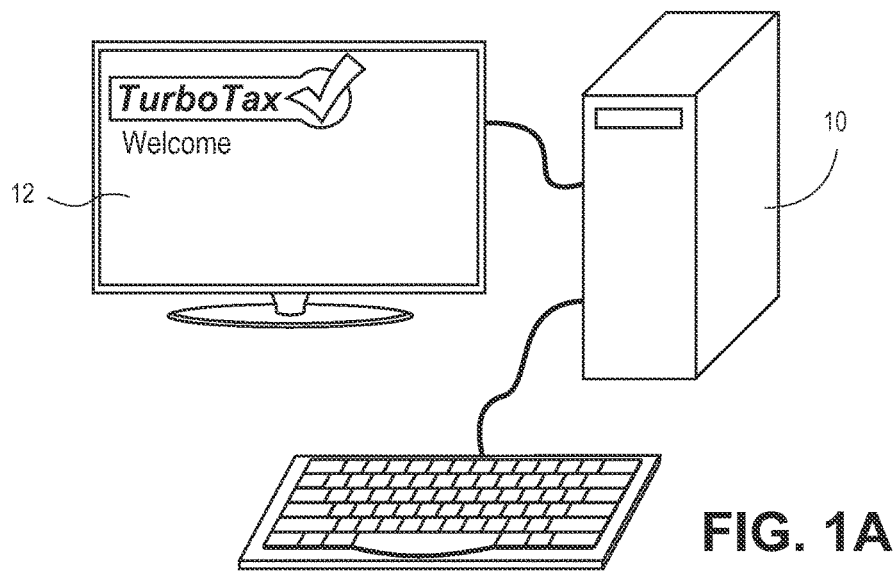
FIG. 1A illustrates a computing device in the form of a personal computer.
Figure 1B:
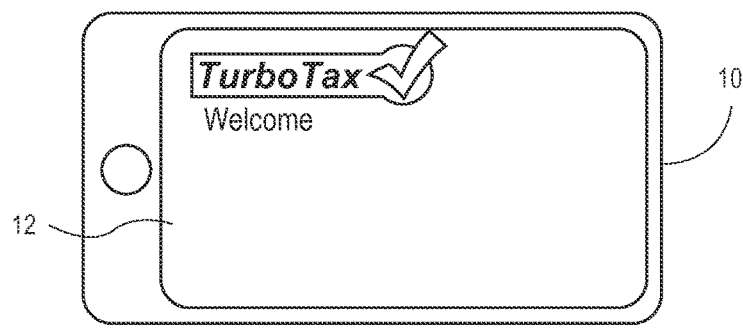
FIG. 1B illustrates a computing device in the form of a tablet.
Figure 1C:
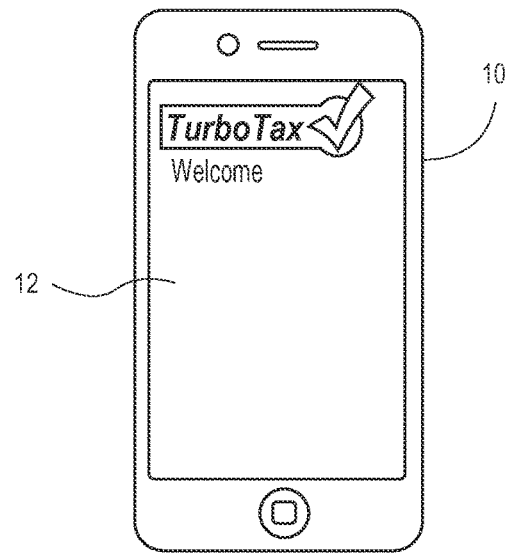
FIG. 1C illustrates a computing device in the form of a smartphone mobile communication device.

FIGS. 1A-1C illustrates various computing devices 10 that are running tax preparation software 12 thereon. FIG. 1A illustrates a computing device 10 in the form of a personal computer (PC) although the computing device 10 may also include a laptop or portable computer. FIG. 1B illustrates a computing device 10 in the form of a tablet or other portable, hand-held computing device. FIG. 1C illustrates the computing device 10 in the form of a mobile phone device (e.g., smart phone). Regardless of the form taken by the computing device 10, the computing device 10 is configured to run tax preparation software 12 thereon. The tax preparation software 12 may run on the computing device 10 in a number of formats or configurations. For example, the computing device 10 may be loaded with tax preparation software 12 using a computer readable medium. The computing device 10 may also be loaded with tax preparation software 12 via download without the need for of a separate computer readable medium. The tax preparation software 12 may run in any number of configurations. For example, it could be a stand-alone software program run on the computing device 10. The software could be run as an application. Alternatively, the software could be run using, for example, an Internet browser or run as a plug-in module. FIGS. 1A-1C illustrate a proprietary tax preparation software or application 12 (i.e., TURBOTAX tax preparation software or application) being run on the computing device 10. TURBOTAX is a registered trademark of Intuit Inc., Mountain View, Calif. It should be understood, however, that any tax preparation software 12 is contemplated by the methods and systems described herein.

Figure 1D:
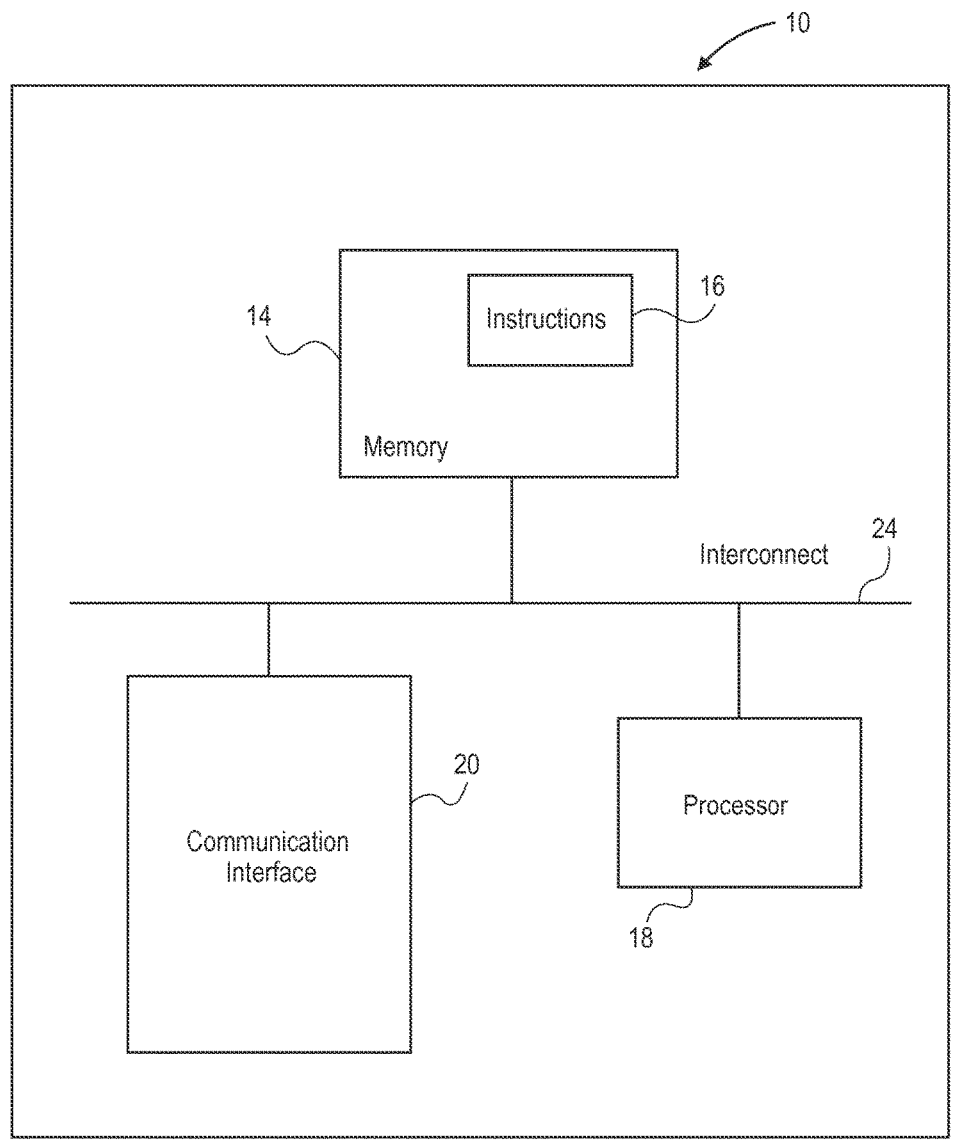
FIG. 1D generally illustrates components of a computing device that may be utilized to execute embodiments described herein.

FIG. 1D generally illustrates components of a computing device 10 that may be utilized to execute embodiments and that includes a memory 14, program instructions 16, a processor or controller 18 to execute account processing program instructions 16, a network or communications interface 20, e.g., for communications with a network or interconnect 24 between such components. The memory 14 may be or include one or more of cache, RAM, ROM, SRAM, DRAM, RDRAM, EEPROM and other types of volatile or non-volatile memory capable of storing data. The processor unit 18 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 24 may include a system bus, LDT, PCI, ISA, or other types of buses, and the communications or network interface may, for example, be an Ethernet interface, a Frame Relay interface, or other interface. The network interface 20 may be configured to enable a system component to communicate with other system components across a network which may be a wireless or various other networks. It should be noted that one or more components of computing device 10 may be located remotely and accessed via a network. Accordingly, the system configuration illustrated in FIG. 1D is provided to generally illustrate how embodiments may be configured and implemented.

Method embodiments may also be embodied in, or readable from, a non-transitory computer-readable medium or carrier or article of manufacture, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 18 performs steps or executes program instructions 16 within memory 14 and/or embodied on the carrier to implement method embodiments.

Figure 2:
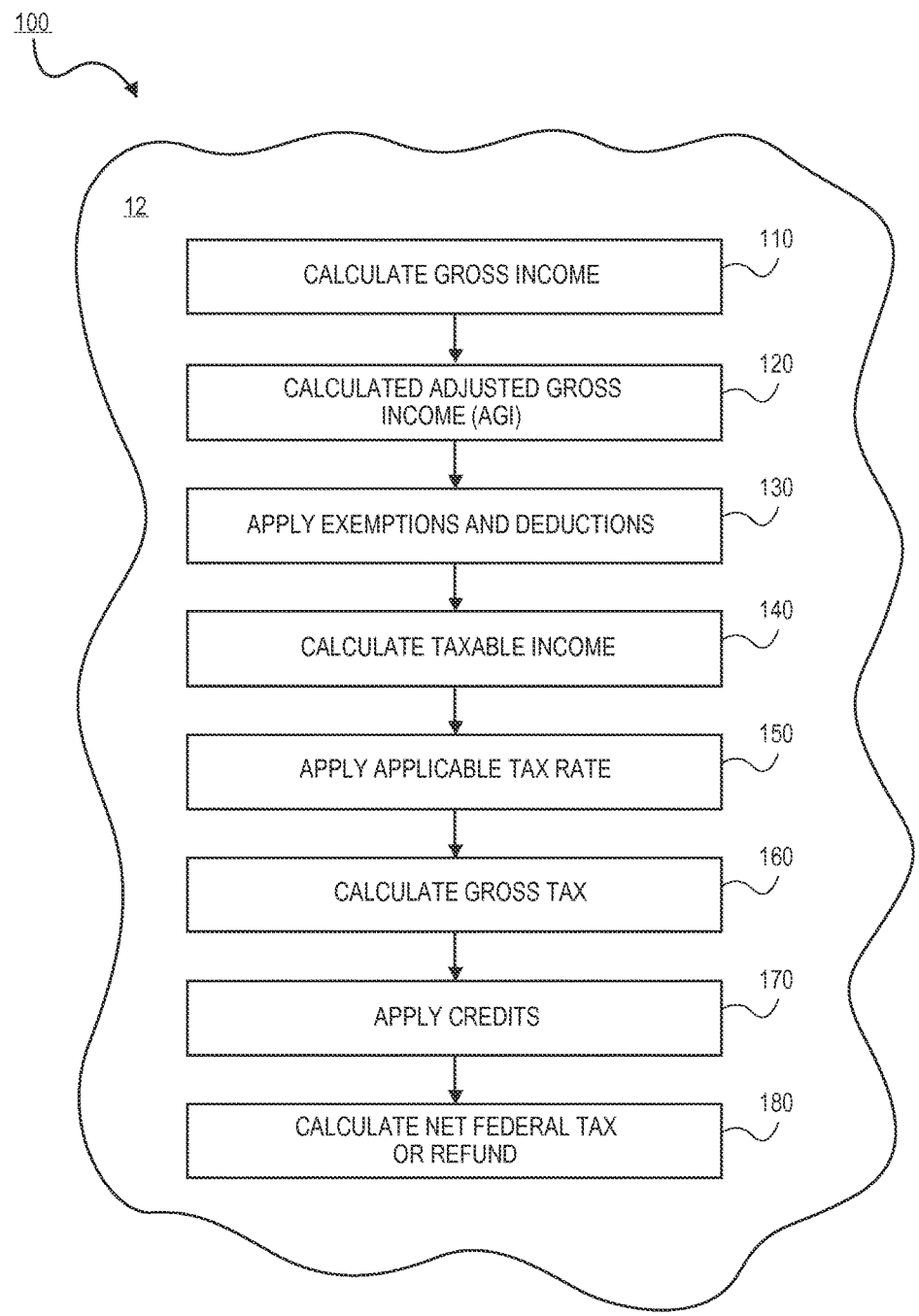
FIG. 2 illustrates a general flowchart of operations for calculating net federal tax.

FIG. 2 illustrates a general method 100 used by the tax preparation software 12 to calculate the net federal tax or refund for a taxpayer. In operation 110, the gross federal income is calculated. Gross federal income is all income from whatever source derived and typically includes wages, fees for services, tips, interest income, dividend income, gains on the disposition of property, rents and royalties, alimony, pensions, and annuities. In operation 120, adjusted the tax payer's gross income is calculated. Adjusted gross income is defined as gross income minus adjustments to income. Examples of adjustments to income include business expenses associated with carrying on a trade or business, health savings account deductions, qualified moving expenses, one-half of the self-employment tax, allowable contributions to retirement plans, alimony paid, college tuition, fees, and student loan interest (with limitations and exceptions).

In operation 130, exemptions and deductions are applied to the federal adjusted gross income to arrive at the federal taxable income as seen in operation 140. Deductions include the standard deduction for taxpayers or, alternatively, itemized deductions. Itemized deductions, which may be subject to income and other limits, includes such things as medical expenses, state and local taxes, property taxes, mortgage interest expense, investment interest, charitable contributions, casualty and theft losses, gambling losses. Some itemized deductions, deemed "miscellaneous deductions" are deductible only to the extent that they exceed a certain floor of adjusted gross income (currently $2% of AGI). Examples of such miscellaneous deductions include job-related clothing or equipment, union dues, unreimbursed work-related expenses, fees paid to tax preparers or to purchase books or software used to determine and calculate taxes, subscriptions to newspapers or other periodicals associated with one's job, and the like.

With the taxable federal income amount determined in operation 140, the applicable tax rate is applied to this number as seen in operation 150. The applicable tax rate, or course, depends on the tax rate that is applicable for the particular tax year. Tax rates are typically progressive meaning that additional income levels are taxed at higher, marginal rates. Tax rates may be contained, for example, in a look-up table or the like. The application of the tax rate to the taxable federal income amount returns a gross tax 160. The amount of this gross tax 160 is then adjusted by applying credits as seen in operation 170. A tax credit is a sum that is deducted from the gross tax 160. Examples of tax credits include, for example, taxes paid (either through estimated taxes or withheld from pay), the earned income tax credit, credits for the elderly or the disabled, retirement savings credits, education credits, energy efficiency credits, and mortgage interest credits. Tax credits can and do vary depending on the applicable tax law. Subtracting tax credits from the gross amount produces the net federal tax or refund as seen in operation 180 in FIG. 2. If the number in operation is 180 is positive, then there is a tax due for the taxpayer. Conversely, if the number in operation 180 is negative, then there is a tax refund due for the taxpayer.

Figure 3:
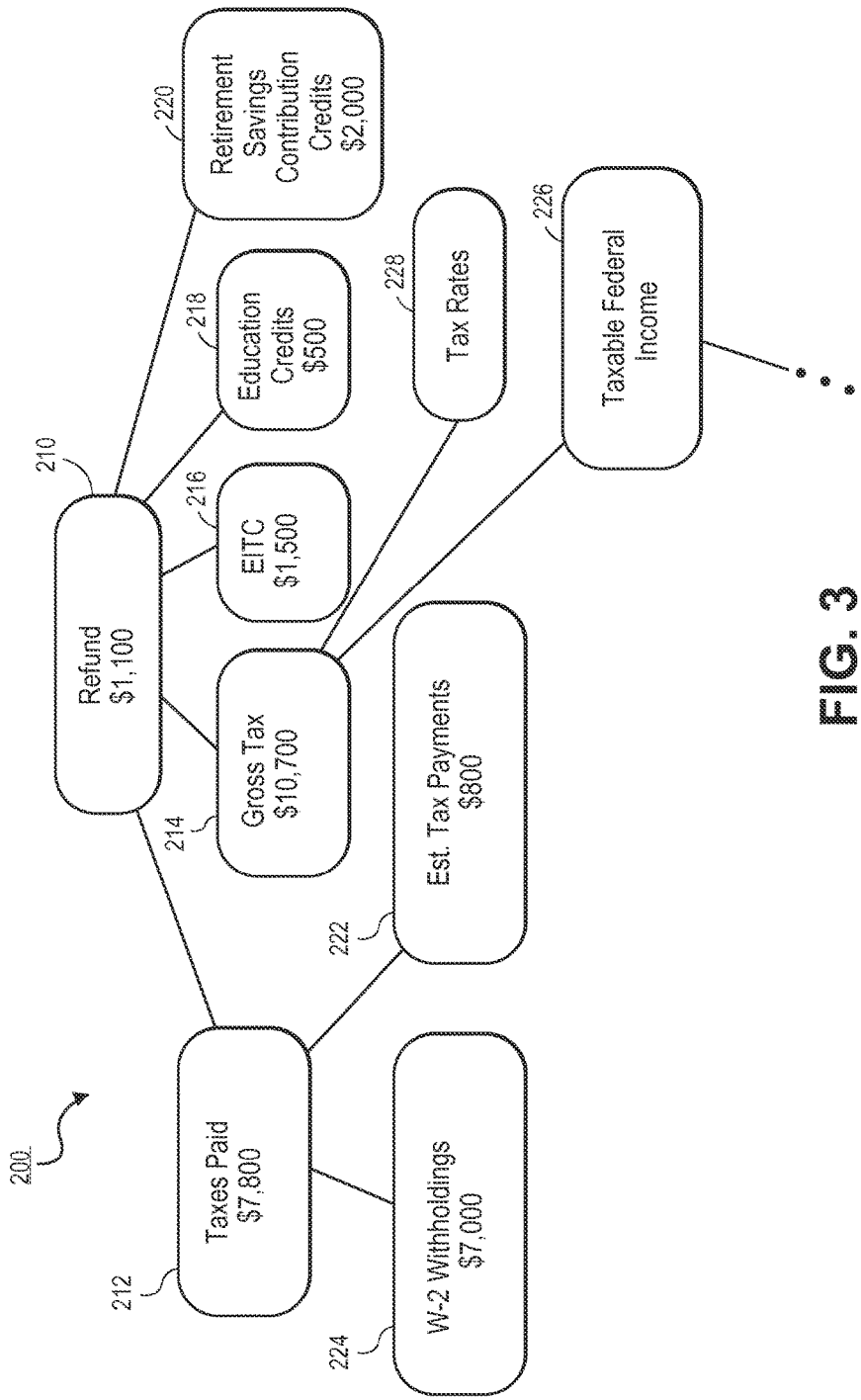
FIG. 3 illustrates an example of a portion of a current year tree data structure.

FIG. 3 illustrates a graphical representation of a portion of a current year tree data structure 200. The current year tree data structure 200 is generated by the computing device 10 operating the tax preparation software 12. The current year tree data structure 200 may include, for example, an interlinked database. The current year tree data structure 200 includes a plurality of intermediate tax liability data for the current year in which taxes are being calculated. Node 210 refers to the root node of the current year tree data structure 200 and includes the net federal tax or refund. In FIG. 3, node 210 shows a refund of $1,100 for the current year. The current year tree data structure 200 includes interior nodes that represent a hierarchy of intermediate calculations that progressively break down the refund (or taxes due) amount down to the input values. As seen in FIG. 3, interior "leaf" nodes that are connected to node 210 include a taxes paid node 212 as well as a gross tax node 214. Various credit nodes are illustrated connected to node root 210. These include the Earned Income Tax Credit (EITC) node 216, education credit node 218, retirement savings contributions credit node 220. In this particular example, which is illustrative, the $1,100 refund amount is obtained by subtracting the taxes paid amount in node 212 from the value of the gross tax in node 214. The additional credits in nodes 216, 218, and 220 are also subtracted from this value to arrive at the refund ($1,100) in node 210.

Various other internal nodes are further connected to yet additional nodes. Still referring to FIG. 3, for example, the taxes paid node 212 is connected to an estimated tax payments node 222 which includes the amount, if any, of quarterly or other periodic tax payments made on behalf of a taxpayer to a taxing authority. Also connected to taxes paid node 212 is a W-2 withholdings node 224 which includes tax withholdings that are taken out of a taxpayer's paycheck.

In this example, the gross tax node 214 is further interconnected to a node 226 that corresponds to taxable federal income as well as a node 228 that corresponds to the applicable tax rate structure that applies to the current year. Note that the node 226 that corresponds to taxable federal income has further internal connection to various intermediate nodes (not shown) that are used to calculate taxable federal income based on the federal adjusted gross income.

Figure 4:
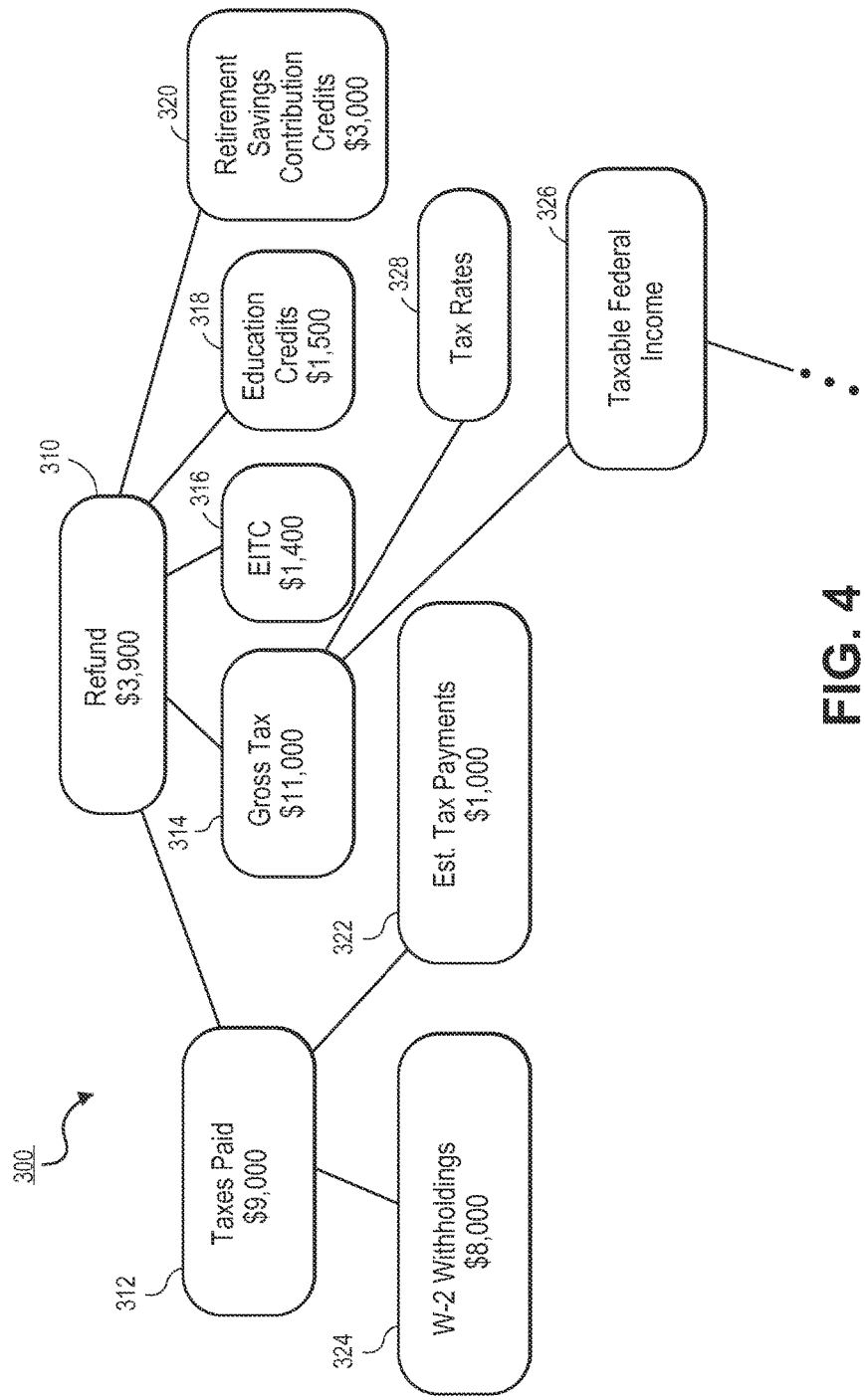
FIG. 4 illustrates an example of a portion of preceding year tree data structure for the same data.

FIG. 4 illustrates a preceding year tree data structure 300 that is similar to the current year tree data structure 200 of FIG. 3 with the exception that the amounts in each respective node represents amounts corresponding to the preceding year. The preceding year tree data structure 300 is also generated by the computing device 10 running the tax preparation software 12. The preceding year tree data structure 300 may also include, for example, an interlinked database. The preceding year tree data structure 300 includes a plurality of intermediate tax liability data for the preceding year in which taxes are being calculated. The preceding year tax data may be automatically detected by the tax preparation software running on the computing device 10. For example, the tax preparation software may automatically search the computing device 10 for tax preparation software files stored therein that contain a prior year's tax data. While the preceding year tax data typically refers to tax data from the immediately preceding year, this is not always the case. For example, preceding year tax data may include tax data from earlier years that are more than one year prior to the current tax year.

In addition, the tax preparation software running on the computing device 10 may search for preceding year tax data in any number of electronic file formats (e.g., TURBOTAX 2012 file). TURBOTAX is a registered trademark of Intuit Inc., Mountain View, Calif. The electronic file may be any particular file that is readable by the tax preparation software. Examples include, but are not limited to, files associated with TURBOTAX H&R BLOCK and TAXACT tax software programs and the like. H&R BLOCK is a registered trademark of H&R Block, Inc., of Kansas City, Mo., and TAXACT is a registered trademark of Endeavor Software Inc., dba $2^{nd}$ Story Software, Inc. of Marion, Iowa. Tax return data from a preceding year may also be obtained from other sources besides an electronic file. Tax return data may be obtained from a printable file in Portable Document Format (PDF). A photograph (e.g., JPEG, TIFF, etc.) of a prior tax return (or of a PDF document) may also be used to obtain tax data. In this regard, useful information may be extracted from image files. U.S. patent application Ser. No. 13/781,393, which is incorporated herein by reference, describes how tax data may be acquired from images containing tax data. As yet another source, tax return data may also be obtained from one or more governmental databases. For example, certain tax agencies (e.g., IRS) may store tax data information in a user-accessible form that can be accessible by the computing device 10.

Returning to FIG. 4, node 310 refers to the root node of the preceding year tree data structure 300 and includes the net federal tax or refund. Like the current tree data structure of FIG. 3, interior "leaf" nodes are connected to node 310 include a taxes paid node 312 as well as a gross tax node 314. Corresponding credit nodes to those of FIG. 3 are illustrated connected to node root 310 in FIG. 4. These include the Earned Income Tax Credit node 316, education credit node 318, retirement savings contributions credit node 320. In this particular example, in a preceding tax year, the $3,900 refund amount is obtained by subtracting the taxes paid amount in node 312 from the value of the gross tax in node 314. The additional credits in nodes 316, 318, and 320 are also subtracted from this value to arrive at the refund ($3,900) in node 310.

Other internal nodes are further connected to yet additional nodes. For example, the taxes paid node 312 is connected to an estimated tax payments node 322 which includes the amount, if any, of quarterly or other periodic tax payments made on behalf of a taxpayer to a taxing authority. Also connected to taxes paid node 312 is a W-2 withholdings node 324 which includes tax withholdings that are taken out of a taxpayer's paycheck. As seen in FIG. 4, the gross tax node 314 is further interconnected to the tax rate node 328 and the taxable federal income node 326.

Figure 5:
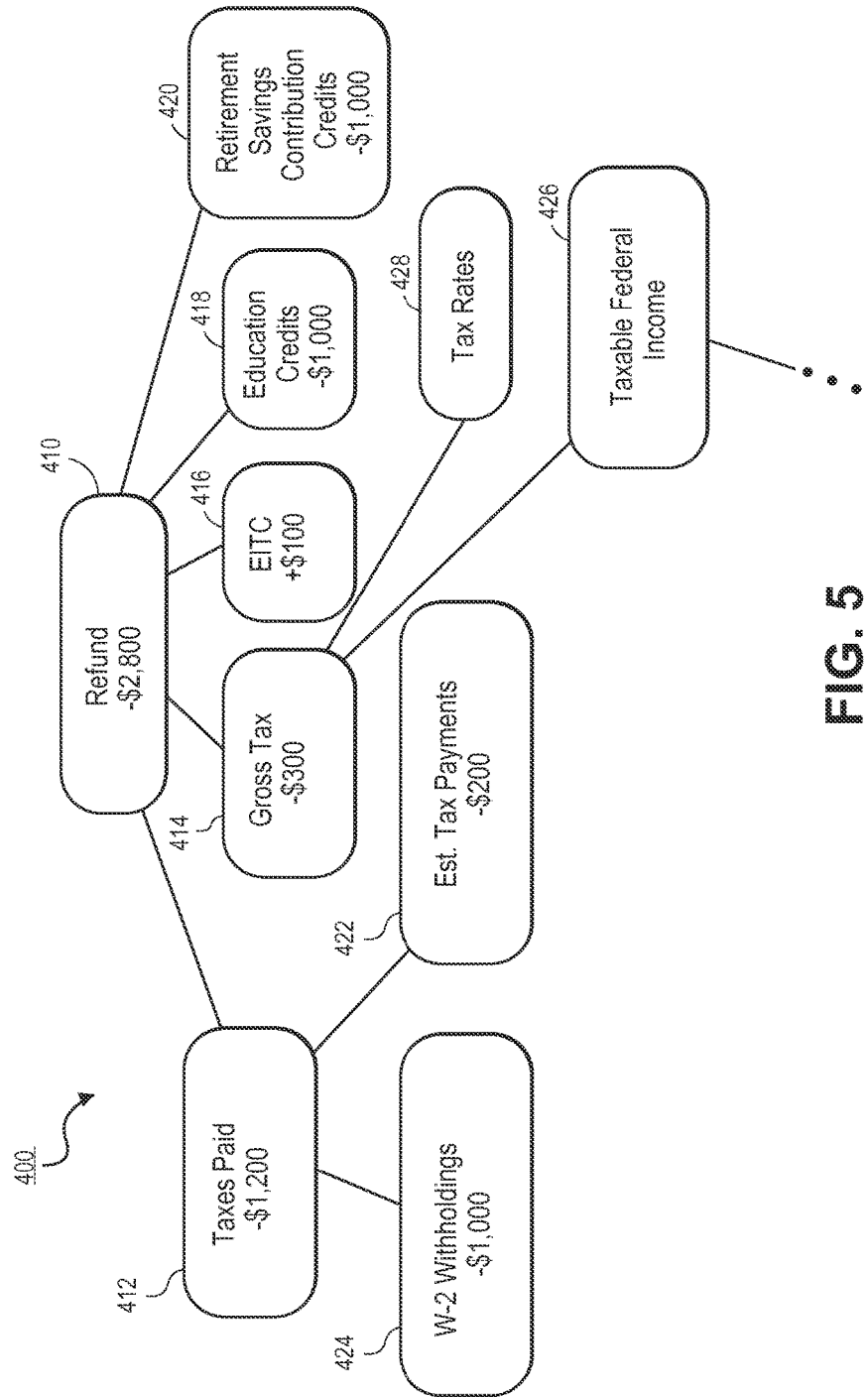
FIG. 5 illustrates an example of a differential tree data structure for the tax data of FIGS. 3 and 4.

FIG. 5 illustrates a differential tree data structure 400, the differential tree data structure includes numerical differences between corresponding intermediate tax liability data from the current year tree data structure 200 and the preceding year tree data structure 300. FIG. 5. Illustrates corresponding nodes as used in FIGS. 3 and 4 with the exception that the numerical difference between the current year values and the preceding year values are contained in the respective nodes. Thus, as seen in FIG. 5, root node 410 includes the amount of –$2,800 which represents the decrease in the refund amount between the current year and the preceding year (i.e., $1,100–$3,900). Corresponding interconnected nodes are illustrated in FIG. 5 including similar differentials between current and preceding year amounts. For example, the differential taxes paid node 412 shows a value of –$1,200 which means that compared to the preceding year, $1,200 less in taxes was paid during the current year. Further refinement of this amount can be seen by nodes 422 and 424. As seen in FIG. 5, estimated tax payments were lower by $200 in the current year (node 422) while W-2 withholdings were $1,000 lower in the current year (node 424).

Similar differentials are illustrated in other nodes. For example, node 414 shows that the gross tax amount for the current year is –$300 which means that the amount of tax due was $300 less this year as compared to the preceding year. Node 416 shows that the taxpayer can claim a higher earned income tax credit in the current year ($100). Node 418 illustrates a reduction of $1,000 in the amount of education credits for the current year as compared to the preceding year. In addition, node 420 shows a reduction of $1,000 in the amount of retirement savings contributions. FIG. 5 illustrates the corresponding nodes for taxable federal income 426 and tax rates 428.

In the example illustrated in FIGS. 3-5, the taxpayer may be concerned that his or her refund, which was $3,900 in the prior year is now much lower ($1,100) in the current tax year and would like the reasons why. In one embodiment, the tax preparation software instructs the computing device 10 to display a multi-level data presentation of the numerical differences from the differential tree data structure of FIG. 5. In one aspect of the invention, the numerical differences that are presented to a user of the tax preparation software need to equal or exceed a pre-defined threshold. This pre-defined threshold may be an absolute dollar amount (e.g., differentials that meet or exceed $50) or it may be a percentage (e.g., percentage of refund or tax due). Further, the order or prominence in which the numerical differences are presented to the user may be based on the particular impact of those changes on the amount of refund/tax due. For example, the numerical differences may be ranked based on the magnitude of the amount the pre-defined threshold(s) have been exceeded. The tax return input changes that most affect the refund or tax due may be presented first or with a more prominent appearance than those that have less of an effect.

Figure 6A:
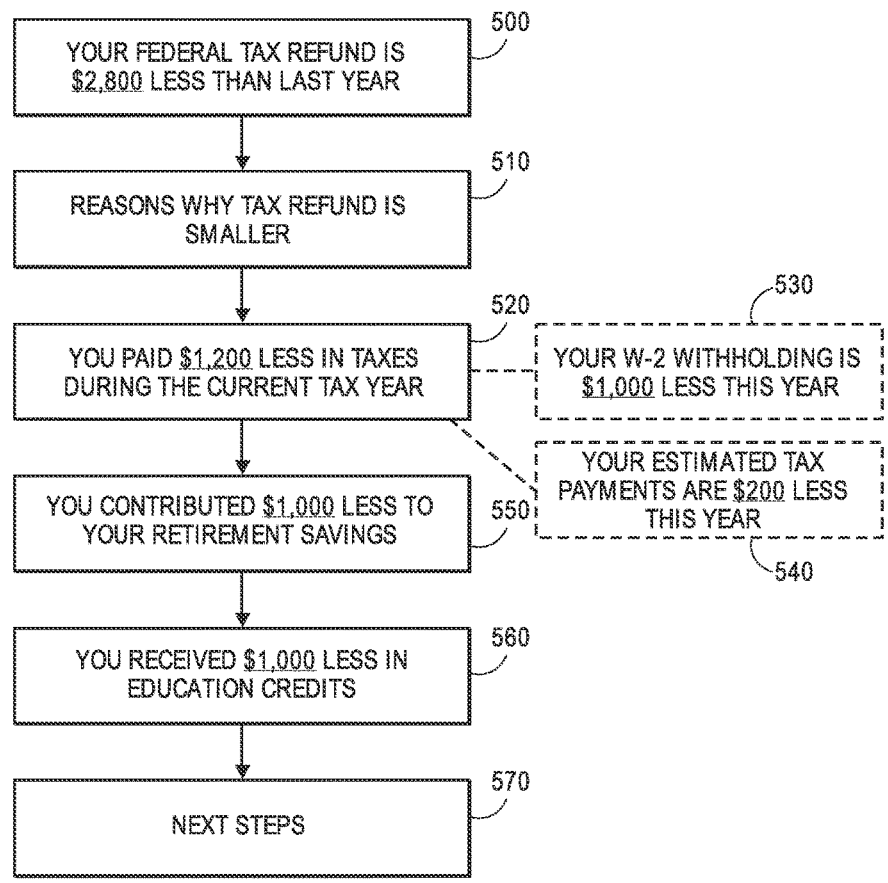
FIG. 6A illustrates a graphical user interface containing one example of a multi-level data presentation of the numerical differences from the differential tree data structure.

FIG. 6A illustrates one illustrate multi-level data presentation that is presented to the user of a tax preparation software program running on the computing device 10. As seen prompt 500 in FIG. 6A, the user is told that the taxpayer's federal refund is $2,800 less than the prior year. The $2,800 may be hyperlinked or otherwise highlighted such that the taxpayer can gain additional insight into the factors that caused this large reduction in the refund amount from the prior year. For example, selecting or linking the $2,800 figure using the mouse cursor may pull up a list of reasons 510 why the taxpayer's refund is smaller this year as compared to the prior year.

Still referring to FIG. 6A, three such reasons are presented to the taxpayer showing the main reasons or driver's why the tax refund is smaller than the prior year. In prompt 520, the user is told that he or she paid $1,200 less in taxes during the current year as compared to the prior year. The $1,200 figure is hyperlinked or otherwise highlighted whereby additional details behind this amount may be obtained. For example, a mouse over event or clicking of this figure by the user may initiate prompts 530, 540 which give additional reasons why less in taxes have been paid in this year. As seen in this example, the taxpayer's W-2 withholding amount is $1,000 less this year than the prior year and in addition, the estimated taxes paid during the year was $200 less than the prior year. In this example, perhaps the taxpayer obtained a new job and claimed a different number of personal allowances on his or her W-4.

FIG. 6A also illustrates in prompt 550 another reason for the reduced refund. In prompt 550 the user is told that he or she made a contribution to their retirement savings that was $1,000 less than the prior year. Another prompt 560 notifies the user that he or she received a $1,000 less in education credits from the prior year. Note that the amounts in prompts 550 and 560 are hyperlinked or otherwise highlighted. As noted above with respect to prompt 520 a mouse event (e.g., mouse over) or click of the link (e.g., clicking event) may bring additional detail on display for viewing by the user. For example, another prompt or the like (much like prompts 530, 540) may be displayed to the user. Alternatively, the user may be taken to another screen where the user is able to see the tax data that is input for the current tax year to ensure that the entry was properly made and not a mistake.

The graphical presentation of FIG. 6A is multi-level in that the reduction in the federal tax refund amount is broken out into a plurality of sub-components that make of the refund differential. The multi-level nature of the presentation is also seen in the various sub-components that may be even further subdivided as illustrated in prompts 530, 540.

One will note that in FIG. 6A, the prompts 500, 510, 520, 530, 540, and 560 are associated with accompanying text so that the user is not only provided with a numerical value but also a textual-based explanation. In one aspect of the invention, the textual-based explanation may be a natural language expression that corresponds to a token. For example, when the differential node 412 for taxes paid produces a positive number, this indicates a token that the taxpayer paid-in more taxes than the preceding year. Thus, the token may invoke a natural language expression such as "you contributed [amount from differential node 412] more in taxes during the current year." Conversely, if the differential node 412 for taxes paid produces a negative number, this indicates a token that the taxpayer paid-in less taxes than the preceding year. Thus, the token may invoke a natural language expression such as "you contributed [amount from differential node 412] less in taxes during the current year." The token may be used and associated with any number of languages. Thus, one need only associate a particular token with any number of expressions in different languages to provide easy multi-language ability to the tax preparation software. These natural language expressions may be provided in a look-up table or the like which is commonly used in software programming.

While FIG. 6A illustrates one embodiment of how data is presented to the user it should be understood that the presentation of the differential tax data between current and preceding years may take a number of different formats. For example, rather that textual based prompts, the differences may be presented in list, a table or row/column format, a nested format (e.g., FIGS. 6B and 6C), or graphical (e.g., chart, graph or the like) for the user. In addition, the method envisions enabling the user to see various levels of detail in the particular intermediate tax calculations. For example, one user may be satisfied with a prompt about his or her itemized deductions being a main reason why the taxes due changed from the prior year to the current year. Another user may want additional details regarding the particular itemized deductions that impacted the tax calculation and may want to drill-down into details of what exact itemized deductions changed. This is seen in FIGS. 6B and 6C whereby users are given the option to progressively drill down into the details of how itemized deductions changed.

Figure 6B:
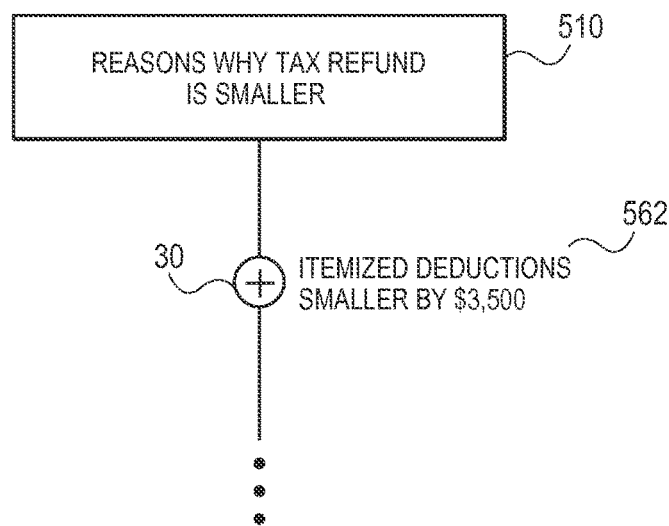
FIG. 6B illustrates another graphical representation of reasons presented to a user why a taxpayer's tax refund is smaller than a preceding year.
Figure 6C:
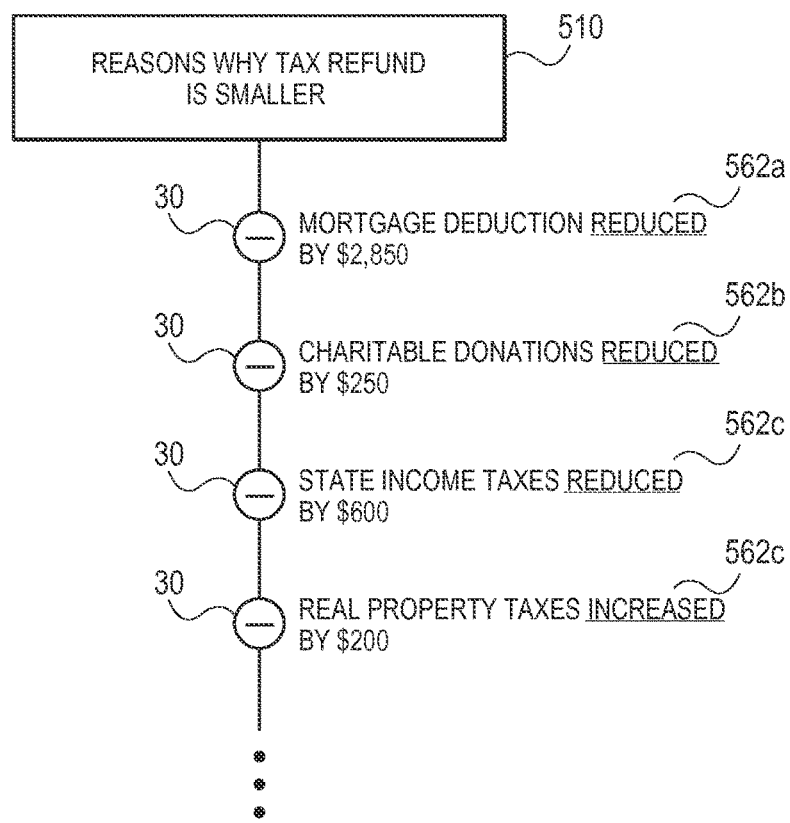
FIG. 6C illustrates another graphical representation of reasons presented to a user why a taxpayer's tax refund is smaller than a preceding year.

In FIG. 6B, the user is presented with a rather top-level view of one reason why the taxpayer's tax liability changed from a prior year. Here the user is told via prompt 562 that itemized deductions are smaller by $3,500 as compared to the prior year. One user may find this information sufficient. However, other users may want more information of how itemized deductions were so much lower. Here, the user may select (e.g., click, mouse over, or the like) a button 30 that expands the prompt 562 to prompts 562*a*, 562*b*, 562*c*, 562*d* as seen in FIG. 6C. As seen in FIG. 6C, prompt 562*a* advises the user that his or her mortgage deduction has reduced by $2,850. Prompt 562*b* advises the user that his or her charitable donations have been reduced by $250. Prompt 562*c* advises the user that state income taxes have reduced by $600. Prompt 562*d* prompts the user that real property taxes have increased (which would make itemized deductions larger) by $200. While prompt 562*d* actually displays an itemized deduction that increased itemized deductions (and would tend to increase the refund amount) the user still has the option to see all activity in itemized deductions that affect the overall calculation. Buttons 30 may be selectively expanded or collapsed depending on the desired level of granularity of the tax data.

Figure 7:
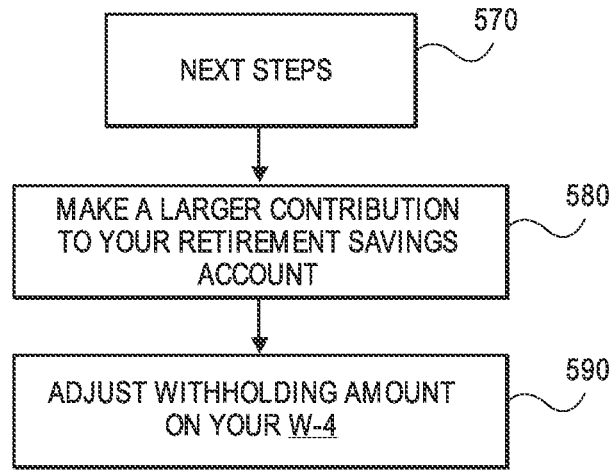
FIG. 7 illustrates a graphical representation presented to a user of next steps that can be taken by a taxpayer in response to a comparison made between a current year and a preceding year.

Referring back to FIG. 6A, in prompt 570 the user is given the option of next steps whereby the tax preparation software may give the users one or more options is they would like to receive a bigger refund or reduce their taxes even more. For example, with reference to FIG. 7, based on the reasons listed in FIG. 6A, the user may be prompted to make a larger retirement savings contribution to reduce his or her tax liability as seen in prompt 580. Another possibility for the example illustrated in FIGS. 3-5 is that the user may be prompted via prompt 590 to adjust his or her withholding amount (e.g., W-4). In the current example, while the taxpayer maybe withholding enough money to cover his or her tax liability, the taxpayer may, nonetheless, want to withhold even more as part of a forced savings plan knowing that the money will be returned via a larger tax refund.

Figure 8:
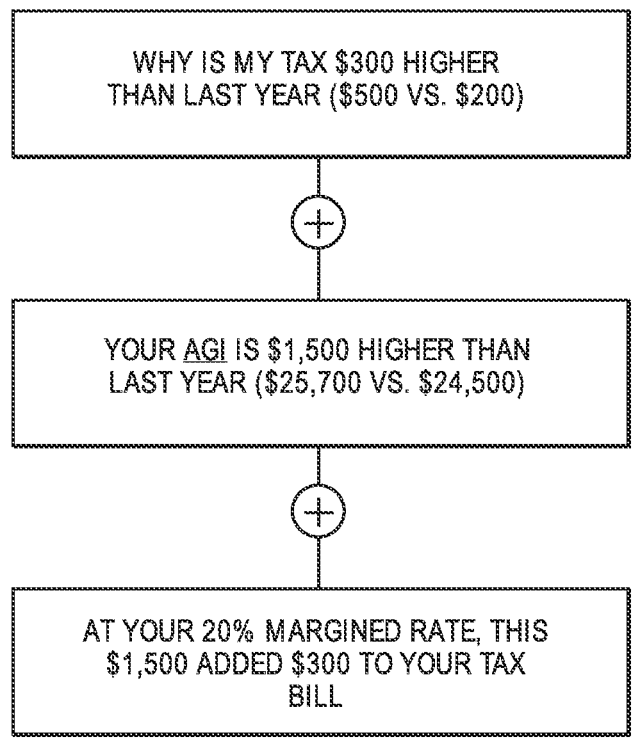
FIG. 8 illustrates a graphical representation of reasons presented to a user why a taxpayer's taxes due amount is larger than a preceding year.

While the invention has largely been described in the context of displaying to the user reasons why his or her refund has decreased from a prior year, the invention is also applicable to explaining differences in tax liability. FIG. 8, for example, illustrates a graphical representation presented to a user explaining the reasons why the taxpayer's taxes went up. In the example of FIG. 8, the user is presented with a natural language expression "why is my tax $300 higher than last year ($500 vs. $200)." The user is presented with an explanation of what caused the increased tax. Here, the taxpayer had an AGI that was $1,500 higher than the prior year. The user is told that the marginal tax rate of 20% this translates into an increase of $300 to the taxes due. Note that AGI in the graphic presentation may be clicked or linked whereby the user is taken to another view or page that shows additional details regarding the components of the AGI figure.

It should be understood that the tree data structures illustrated in FIGS. 3-5 are illustrative. Tree data structures may include any number of intermediate calculations or steps required to calculate a tax due amount or refund. These include, by way of example, gross income, adjusted gross income, taxable income, gross tax, tax credits, and tax rate. The tree data structure may be generated for federal, state, or even local tax returns.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, it will be understood that embodiments can be implemented using various types of computing or communication devices. For example, certain embodiments may be implemented utilizing specification of tax return questions, the content tree or other data structure, the rules utilized to alter factor values of functions may be included in a spreadsheet, for example, and a compiler to extract definitions and generate a JavaScript file for business logic and a user experience plan (based on the tree hierarchy). Mobile and web runtime can be created and that can consume generated files, and initiate user experience based on the content. When a user inputs data, embodiments may be triggered to execute during runtime to execute rules, adjust factor values resulting in modification of function outputs, and filter questions as necessary and re-order the visible questions based at least in part upon the function outputs. Embodiments, however, are not so limited and implementation of embodiments may vary depending on the platform utilized.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method of presenting a user with tax liability changes between a current year and a preceding year comprising:
   a computing device executing tax preparation software configured to receive tax return data from a current year and a preceding year;
   the computing device creating a current year tree data structure comprising a plurality of interconnecting nodes, the current year tree data structure comprising a plurality of intermediate tax liability data for the current year;
   the computing device forming a remote network connection with a tax agency database containing tax data for the user for the preceding year;
   the computing device creating a preceding year tree data structure comprising a plurality of interconnecting nodes having the same hierarchy as the current year tree data, the preceding year tree data structure comprising a plurality of intermediate tax liability data for the preceding year;
   the computing device populating the preceding year tree data structure with tax data obtained from the tax agency database;
   the computing device creating a differential tree data structure comprising a plurality of interconnecting nodes having the same hierarchy as the current year tree data and preceding year tree data, the differential tree data structure comprising numerical differences between corresponding intermediate tax liability data from the current year and the preceding year; and
   the computing device generating a graphical user interface with the tax preparation software that includes a multi-level data presentation on a display associated with the computing device of the numerical differences from the differential tree data structure, wherein the multi-level data has a similar hierarchy of the interconnecting nodes of the differential tree data structure and includes extracted data therefrom and wherein the multi-level data presentation further includes a natural language expression corresponding to a token, the computing device selecting a natural language expression associated with the token at a particular node in the differential tree data structure that explains a reason for the associated numerical difference, wherein the multi-level data presentation on the display comprises an interactive link associated with the numerical difference that links to additional, more detailed natural language expressions for the associated numerical difference, the additional natural language expressions corresponding to respective tokens associated with other nodes in the differential tree data structure.

2. The method of claim 1, wherein the additional natural language expressions are triggered by a mouse over event.

3. The method of claim 1, wherein the additional natural language expressions are triggered by a clicking event.

4. The method of claim 1, wherein the natural language expressions are selected from a plurality of different languages.

5. The method of claim 1, wherein the multi-level data presentation highlights the numerical differences from the differential tree data structure meeting a pre-determined threshold.

6. The method of claim 5, wherein the pre-determined threshold is a dollar amount.

7. The method of claim 5, wherein the pre-determined threshold is a percentage difference.

8. The method of claim 1, wherein the interactive links comprise hyperlinks.

9. The method of claim 1, wherein the multi-level data presentation contains one or more of federal gross income, federal adjusted gross income, federal taxable income, federal gross tax, federal tax credits, tax rate, and net federal tax due or refund.

10. The method of claim 1, wherein the multi-level data presentation contains one or more of state gross income, state adjusted gross income, state taxable income, state gross tax, state tax credits, tax rate, and net state tax due or refund.

11. The method of claim 1, further comprising:
    the computing device presenting to a user of the tax preparation software a recommendation based at least in part on the multi-level data presentation.

12. The method of claim 1, wherein the multi-level data presentation of the numerical differences from the differential tree data structure is presented in a list format.

13. The method of claim 1, wherein the multi-level data presentation of the numerical differences from the differential tree data structure is presented in a nested format.

14. The method of claim 1, wherein the multi-level data presentation of the numerical differences from the differential tree data structure is presented in a graphical format.

15. A computer-implemented method of comparing a current year tax return to a preceding year tax return using tax preparation software comprising:
- a computing device receiving tax return data from a current year and creating a current year tree data structure comprising a plurality of interconnecting nodes, the current year tree data structure comprising a plurality of intermediate tax liability data for the current year;
- the computing device forming a network connection with a remote tax agency database containing tax data for the user for the preceding year;
- the computing device receiving tax return data from the preceding year and creating a preceding year tree data structure comprising a plurality of interconnecting nodes having the same hierarchy as the current year tree data, the current year tree data structure comprising a plurality of intermediate tax liability data for the preceding year;
- the computing device populating the preceding year tree data structure with tax data obtained from the tax agency database;
- the computing device creating a differential tree data structure comprising a plurality of interconnecting nodes having the same hierarchy as the current year tree data and the preceding year tree data, the differential tree data structure comprising numerical differences between corresponding tax liability data from the current year and the preceding year;
- the computing device executing the tax preparation software and computing taxes due for the current year and the preceding year; and
- the computing device generating a graphical user interface with the tax preparation software on a display associated with the computing device that includes one or more reasons expressed as natural language expressions of why the computed taxes due differs from a taxes due amount from the preceding year along with a data presentation that includes numerical differences from extracted data obtained from at least a portion of the differential tree data structure, wherein the natural language expressions corresponding to a token, the computing device selecting a natural language expression associated with the token at a particular node in the differential tree data structure that explains a reason for the associated numerical difference, wherein the multi-level data presentation on the display comprises an interactive link associated with the numerical difference that links to additional natural language expressions for the associated numerical difference, the additional, more detailed natural language expressions corresponding to respective tokens associated with other nodes in the differential tree data structure.

16. The method of claim 15, wherein the reasons presented to the user are ranked based on the magnitude affecting computed taxes due amount.

* * * * *